Patented Nov. 28, 1933

1,937,410

UNITED STATES PATENT OFFICE 1,937,410

PROCESS FOR OBTAINING EXTRACTS FROM VEGETABLE AND ANIMAL MATERIALS

Francis C. Nicholas, Baltimore, Md.

No Drawing. Application March 23, 1932
Serial No. 600,831

3 Claims. (Cl. 99—11)

The object of the invention is to provide a process for obtaining vegetable extracts and other juices in their natural state by the application of an agent to the material from which the extract is to be obtained, so that the food, medicinal or chemical values of the material, in their natural state, may be effectively secured and in a minimum time.

In the process, the material to be treated for the purpose of extracting the food, chemical or organic compounds is reduced by cutting, peeling, crushing, grinding, grating or by any method to bring the ingredients into intimate contact with the agent employed, which in the present case is glucose, the viscosity of which is immaterial. Fairly heavy glucose, however, in the commercial form is preferred.

After the reduction of the material as above indicated the glucose is added and the whole is allowed to stand, or agitated or macerated, as may be deemed best for the different compounds which are to be obtained.

The compound, mixture or infusion resulting from the application of the glucose, is then put under pressure to obtain the extract; or the material sought may be filtered out or allowed to drain off. Water may be added to cause the mass to become more fluid for the purpose of aiding filtration or drainage.

In the process the glucose is preferably applied cold resulting in the extraction of beneficial ingredients in their natural state, in solutions of new physical properties, the glucose losing its viscosity and the materials sought entering into solution, or combination, with it, resulting in copious liquid even in the case of non-juicy vegetables. The juice or liquid obtained is in the form of active ferments and is potable, contains valuable food, medicinal or chemical ingredients, and is ready for use as may be desired.

In order to obtain a suitably liquefied compound the correct proportion of glucose must be employed to effect a complete combination, or mingling, of the ingredients sought without an excess of uncombined, or unmingled, glucose. This result can be obtained by calculating a formula for each material to be treated, but is more conveniently arrived at by adding the glucose gradually until a suitable liquid is obtained, and if it happens that too much glucose has been employed, resulting in the presence of free glucose, then more of the untreated pulp may be added to satisfy a reaction, or combination, with any remaining free glucose.

The glucose is preferably applied cold, resulting in the production of useful food constituents in a form simulating their natural state, but a reasonable amount of heat may, if desired, be applied to the glucose or the glucosic pulp, provided the heating is not sufficient to cause coagulation, jellying or cooking of the material sought.

The glucose is preferably applied alone. It is, however, permissible to add to the glucose, or to the glucosic pulp, seasoning materials, flavors, sugars, drugs, chemicals and other ingredients or food materials which it is desired to incorporate with the vegetable or other liquid compounds. This may be done without impairing the extraction, but the procedure is wasteful of the added ingredients, and preferably I produce a simple extraction of the liquid compound using glucose only. The resulting product is immediately available for commercial use, and is obtained by a one step process, the addition of glucose, which I have discovered is a direct combining agent, or solvent, for useful ingredients found in organic materials.

The resulting product, from the above described single step process can be combined with seasoning materials, flavors or other ingredients as the users may find convenient.

The invention having been described, what is claimed as new and useful is:

1. A process for obtaining extracts from vegetable and animal materials which comprises their reduction to a pulpy state, thereafter the application of glucose to the pulp, and finally the separation of the pulp and fluid.

2. A process for obtaining extracts from vegetable and animal materials which comprises their reduction to a pulpy state, thereafter the application of glucose to the pulp, then the agitation of the mass, and finally the separation of the pulp and fluid.

3. A process for obtaining extracts from vegetable and animal materials which comprises their reduction to a pulpy state, thereafter the application of glucose to the pulp, then the agitation of the mass, and finally the removal of the fluid by the application of pressure to the mass.

FRANCIS C. NICHOLAS.